Jan. 4, 1949.    L. F. CAMPBELL    2,458,466
CAMERA ADAPTER FOR STEREOPICTURES
Filed April 23, 1947    2 Sheets-Sheet 1
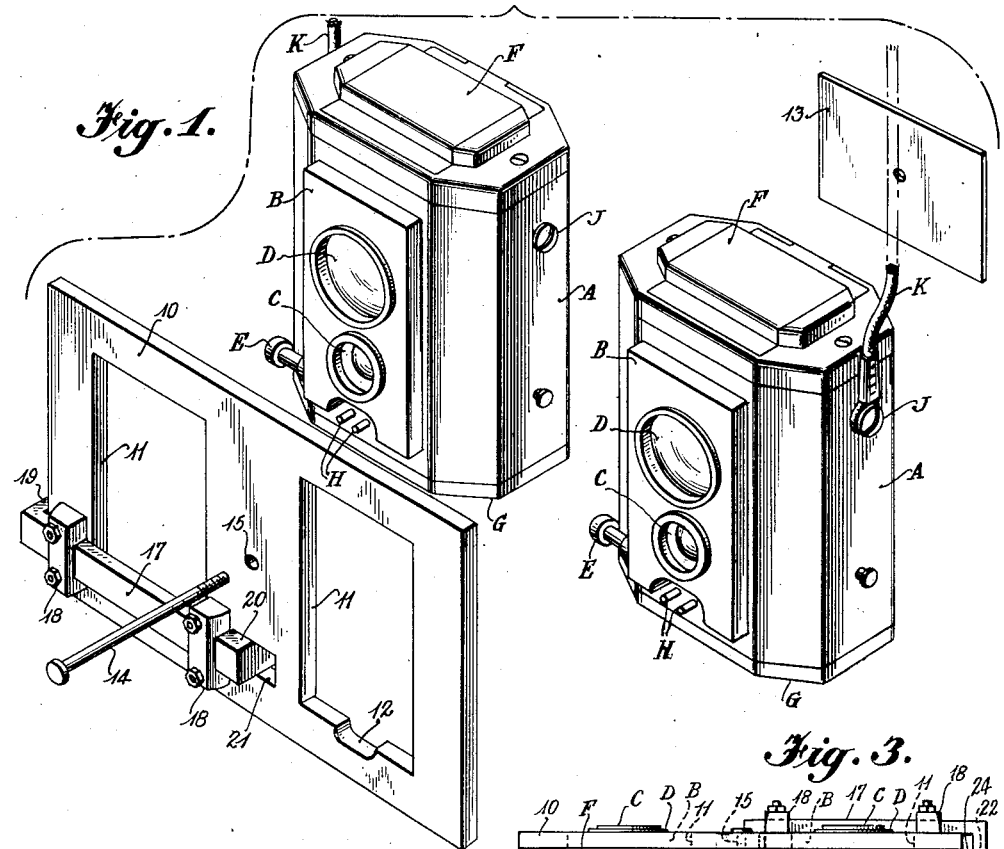
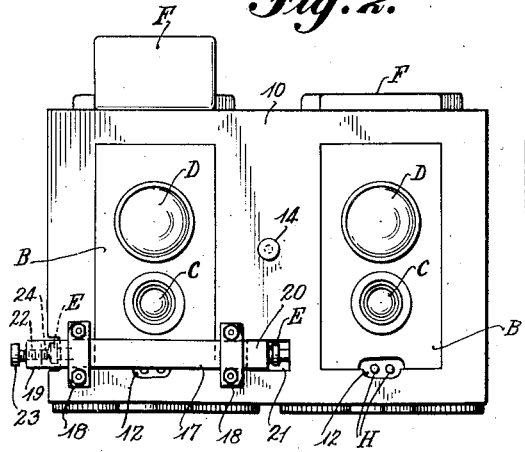
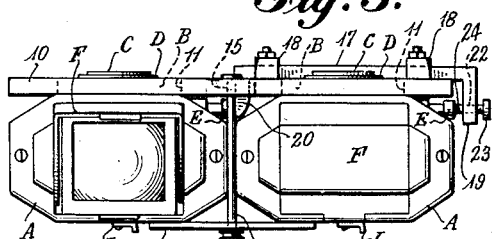
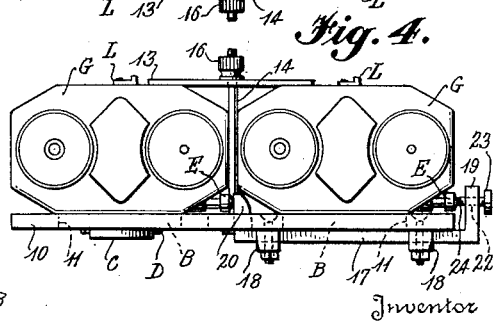
Inventor
Lawrence F. Campbell

Jan. 4, 1949.     L. F. CAMPBELL     2,458,466
CAMERA ADAPTER FOR STEREOPICTURES
Filed April 23, 1947     2 Sheets—Sheet 2
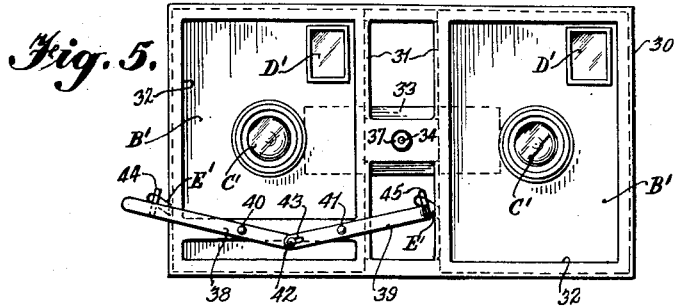
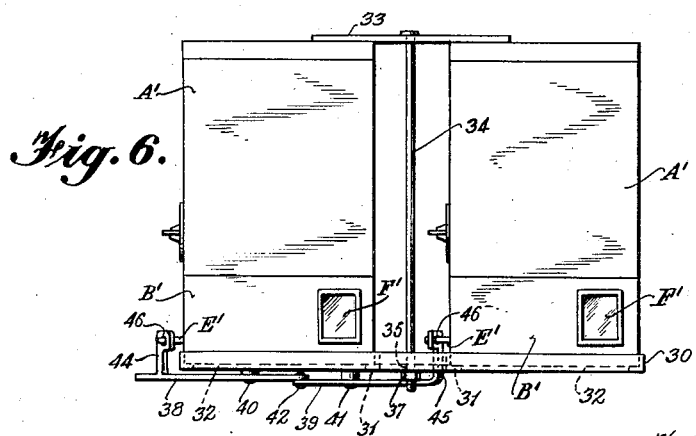
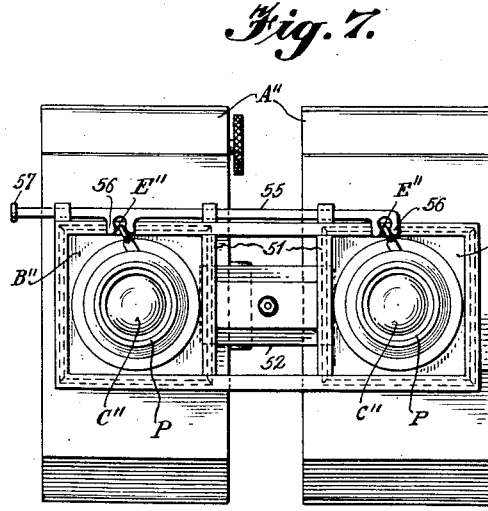
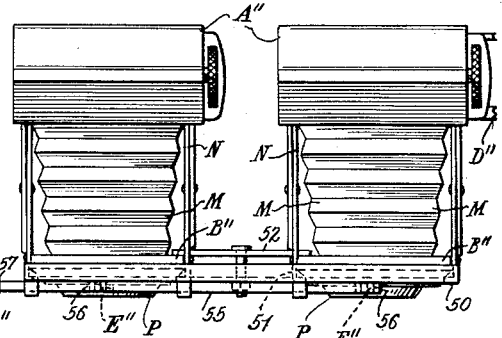
Inventor
Lawrence F. Campbell Patented Jan. 4, 1949

2,458,466

UNITED STATES PATENT OFFICE 2,458,466

CAMERA ADAPTER FOR STEREOPICTURES

Lawrence F. Campbell, Silver Spring, Md.

Application April 23, 1947, Serial No. 743,372

3 Claims. (Cl. 95—18)

This invention relates to photographic apparatus and more particularly to a device for adapting standard commercially available cameras for taking stereo-pictures.

It is well known that the stereo effect may be obtained in photographic pictures by the taking of two pictures of the same object from slightly different angles which correspond generally to the spacing of a person's eyes. When these pictures are observed, one by each eye, the stereo effect, that is the third dimension of depth, is observed.

Stereo-pictures are usually taken by an expensive camera which essentially comprises two complete cameras for exposing two separate images side-by-side upon a single film. These cameras are far too expensive for popular use and, consequently, are employed only by professional photographers. In order to popularize the taking of stereo-pictures various devices have been developed.

One type of device comprises a beam splitter for mounting in front of the lens of a standard camera to divide the optical image into two separate images which are exposed within the single exposed area of the camera. This device has not proven popular with the amateur photographer, both because of the expense, as a high quality optical device is required, and because the resultant photographic images are too small for practical use. Obviously a device of this type is not adapted for use with inexpensive fixed focused cameras, and consequently does not have wide utility or appeal.

Another type of device that has been placed on the market comprises a base for attachment to a tripod and having a camera holder slidably mounted thereon so that a camera can be mounted on said holder and image exposed with said holder at one side of the base and then the holder may be moved to the other side of the base and a second image exposed on a fresh section of film. This type of device has two principal drawbacks, namely, it requires a stable support such as a tripod so that the images will be the same except for angle, and it is capable of use only for taking pictures of still objects and not for taking snapshot pictures of objects which are likely to move, such as people.

It has also been proposed that two cameras be mounted upon a base which is adapted for attachment on a tripod, but this device merely supports the two cameras so that one may be used as a view camera for focusing the other and has not adapted the two cameras for the taking of stereo pictures by providing means for simultaneously operating the shutters in both cameras. Consequently, none of the prior art disclosures provide an inexpensive device for use with all types of cameras including fixed focus cameras that adapts a pair of said cameras for the taking of stereo pictures and for simultaneously operating the shutters of both of said cameras.

Having in mind the defects of the prior art stereo adapters it is an object of this invention to provide an adapter for rigidly holding two cameras in spaced relation and for synchronizing the shutter levers of said cameras so that they may be operated simultaneously in order to expose both of said cameras at the same time.

It is another object of this invention to provide a stereo adapter that is readily portable and adapts a pair of cameras for simultaneous exposure so that snapshot stereo pictures may be taken.

It is still another object of this invention to provide a stereo adapter that comprises simplicity of design and economy of construction with certainty of operation so that it may be readily employed by amateur photographers and without a substantial increase in cost over the taking of single snapshots.

The foregoing objects and others ancillary thereto preferably comprise, according to a preferred embodiment of the invention, a framelike holder for pocketing the fronts of two cameras with a clamping device for retaining said cameras in said holder and lever mechanism movably supported by said holder and adapted for cooperation with the shutter levers of both of said cameras so that upon operation of said lever mechanism both of said shutter levers will be operated simultaneously. Specifically, the holder comprises a frame having two spaced frames having openings therein for receiving and exposing the fronts of two separate cameras, and the clamping device may comprise a clamping plate for resting against the backs of the housings rigid with the front of the camera, the shutter housing in folding cameras, and including a bolt to extend forwardly between said cameras and through the front frame holder to be secured thereto by a suitable nut.

A lever mechanism is mounted on the front of the frame holder and may vary in type according to the type and positioning of the shutter levers of said cameras. With some types of shutter levers, the lever mechanism may comprise a bar slidably mounted across the front of said holder and on one side thereof with a pair of arms extending angularly from the bar for contacting the shutter levers of said cameras and a finger piece on the outer end of the bar so that upon pressing the finger piece to slide the bar, both of said shutter levers will be operated simultaneously. For other types of shutter levers, a pair of bars may be pivoted together at their adjoining ends and each of said bars pivoted on said holder and having angularly extending arms for cooperating with vertically moving shutter levers so that upon vertically moving the free end of the outer bar, the free end of the inner bar will also be moved vertically in the same direction.

The novel features that are considered characteristic of the invention are set forth with particularity in the appended claims. The invention itself, however, both as to its organization and its method of operation, together with additional objects and advantages thereof, will best be understood from the following description of the specific embodiments when read in connection with the accompanying drawings, wherein like reference characters indicate like parts throughout and in which:

Figure 1 is an exploded view in perspective of a stero adapter and two cameras to be mounted in said adapter;

Figure 2 is a front view in elevation of the adapter with a pair of cameras mounted therein;

Figure 3 is a top plan view of the assembly shown in Fig. 2;

Figure 4 is a bottom plan view of of the assembly shown in Fig. 2;

Figure 5 is a front view in elevation of a modification of the invention for adapting box cameras for the taking of snapshot stereo pictures;

Figure 6 is a top plan view of the structure shown in Fig. 5;

Figure 7 is a front view in elevation of another modification of the invention for adapting folding cameras for the taking of snapshot stereo pictures; and Figure 8 is a top plan view of the structure shown in Fig. 7.

Referring now to the drawings, specifically to Fig. 1, the present invention comprises a holder 10 in the general shape of a rectangular frame with its longer direction extending horizontally and having two spaced side-by-side openings 11 extending therethrough. The frame shown in Fig. 1 is particularly adapted for use with a well known fixed focus camera, of the type shown in the drawings and commercially available as a product of the Eastman Kodak Company. This particular camera, as best shown in Fig. 1, comprises a casing A having a rectangular offset lens and shutter housing B extending outwardly from the front thereof, a camera lens C and a finder lens D in said offset housing B, a shutter lever E in the form of a plunger, and extending latterly from said casing A, a finder shade F enclosing the viewing plate of the finder, a removable lower end G of the casing A for loading the camera, a plug H for connection with a flash unit, buttons J on the sides of the casing A for the reception of the ends of a carrying strap or cord K, and a lever L on the rear side of the casing A for operating a latch for locking the removable end G in position.

To accommodate this type of camera, as shown in Figs. 1 through 4, the frame 10 can be in the form of a flat, rigid plate and the openings 11 are of a size and shape to receive the offset shutter housings B so that the plate frame 10 rests against the front surfaces of the camera casings A. Notches 12 are cut into the plate 10 from the bottom edges of the openings 11 to receive and expose the flash unit contact H to receive the plug of a flash unit so that stereo flashlight pictures may be taken if desired. In order to clamp the cameras to the holder frame 10, a clamping plate 13 is provided and is of such a size as to span the distance between the two camera casings A when they are mounted to the frame 10. The plate 13 is adapted to rest against the rear surfaces of the camera casings A, but not to interfere with the latch levers L. A clamping member, such as a bolt 14, extends forwardly from said plate 13 to pass between the casings A and through an aperture 15 centrally of the plate frame 10 to receive a nut 16 for tightening the plate 13 toward the frame 10 to firmly clamp the camera casings A to the holder 10.

A bar 17 is slidably mounted on the front of the plate 10 by means of straps having their ends secured to said plate 10 and extending around the bar 17. The bar 17 is positioned to one side of the frame holder 10 and beneath one of the openings 11 and has its ends 19 and 20 turned rearwardly of the frame 10. The free end of the bar 19 extends beyond the end of the frame 10 and is turned rearwardly to cooperate with the shutter plunger E of the camera located immediately behind the bar 17. The inner end 20 of the bar 17 extends rearwardly through a slot 21 in the plate frame 10 to cooperate with the shutter plunger E of the camera to one side of the bar 17. Thus by pushing the free end 19 to slide the bar laterally toward the other end of the holder, the rearwardly extending ends 19 and 20 thereof will bear against their respective shutter plungers E to operate the shutters of the two cameras simultaneously.

As there may be some slight differences in the relative positions of the shutter plungers E of a plurality of cameras, and as the bar 17 must move a predetermined distance to operate the shutter plungers E, the length of the bar is such that the free end 19 is spaced sufficiently from the adjacent edge of the frame 10, when the inner end 20 is seated against its plunger E, that the free end 19 readily fits beyond its shutter plunger E. Consequently, in order to take up any space between the end 19 and its shutter plunger E, the end 19 is provided with a threaded aperture 22 adapted to receive a threaded thumb screw 23 which may be adjusted laterally until its inner end 24 rests snugly against the end of the adjacent shutter plunger E.

Thus, it will be seen that an inexpensive apparatus for taking snapshot stereo pictures is provided by mounting twin cameras in the frame holder 10 and rigidly clamping the camera casings A thereto, by means of the plate 13 and bolt 14, so that the shutter bar 17 may cooperate with the shutter plungers E of both cameras to simultaneously operate both shutters. The plate frame holder 10 is adapted to cooperate with the lens housing B of the Brownie Reflex cameras so that the removable ends G of the camera casings A are left uncovered and, consequently, the cameras may be reloaded without detaching them from the holder 10. In addition, the clamp plate 13 is of sufficient length to span the distance between the camera housings but not to interfere with the lever L for operating the latch which holds the removable ends G in the casings A. Furthermore, a single carrying strap K may easily be employed by disconnecting one end of the strap from the inner button J on one camera and connecting it with the outer button J of the other camera.

Although the adapter, comprising the present invention, is particularly advantageous for use with cameras of the type shown in Figures 1, 2, 3 and 4, it may be readily employed for use with other cameras such, for instance, as ordinary box cameras as shown in Figs. 5 and 6. The usual box camera comprises a casing A' of box formation that is mounted behind a lens and shutter housing B' of the said cross-sectional dimensions as the casing A'. The housing B' is provided with the usual lens C' and finder D' in the front, shutter lever E' extending from the side, and finder window F' in the top. For use with this type of camera, a holder 30 is composed with angular frames 31 for receiving the fronts of the box cameras and fitting around the front edges. The inner edges of the angle frames 31 form openings 32 for exposing the camera aperture C' and the finder D'. A clamp plate 33 is adapted to fit against the rear surfaces of the housings A' of the cameras, and is provided with an elongated bolt 34 for extending between the camera casings A' and through an aperture 35 in a strap 36 extending between the inner uprights of the adjacent frames 31. A nut 37 is threaded on the bolt 34 for drawing the clamp plate 33 toward the holder 30 to rigidly hold the camera casings A' in the frames 31.

In box cameras of this type, the shutter levers E' usually extend laterally from the housing B' and are pivotally mounted so that they are moved vertically to operate the shutter. To accommodate this type of shutter lever, an articulated lever composed of a pair of links 38 and 39 is provided to operate the levers E' simultaneously. The links 38 and 39 are pivotally mounted on pins 40 and 41, respectively, which are carried on the front of the frame 30, and the inner adjacent ends of the links 38 and 39 by a lost-motion pivotal connection, one of said ends carrying a stud 42 which is slidable in a slot 43 in the other end. The outer ends 44 and 45, of said links 38 and 39, are inturned rearwardly and are provided with slots 46 for fitting over the ends of the laterally extending shutter levers E'. By this arrangement, the movement of the end 44 in one direction will cause the end 45 to be moved in the same direction, and each of said ends will move their respective shutter levers E' so that the shutters of the two cameras will be operated simultaneously.

The concept of the invention is also adapted to folding cameras as shown in Figs. 7 and 8. The usual folding camera comprises a relatively flat rectangular casing A'' and a movably positioned lens and shutter housing B'' that is connected to said casing A'' by a bellows M and folding braces N. The camera employed as an illustration, has a shutter lever E'' extending radially from the cell P of the lens C'' and the finder D'' is mounted on the side of the casing A''. For a camera of this type, a frame structure 50, of the type shown in Figs. 5 and 6, is employed to provide frames 51 for receiving the lens and shutter housing B''. A clamp plate is adapted to clamp against the rear sides of the shutter and lens housing B'', rather than the rear of the casings A'', because the connection through the braces N and bellows M is not sufficiently rigid. The shutter levers E'' extend vertically from the lens mounts P, and to accommodate levers of this type, a bar 55, similar to the bar 17 in the first modification, is mounted on the front of the frame 50 and to the top thereof. The bar 55 is provided with downwardly extending forked members 56, for straddling the shutter levers E'', and with a finger piece 57 protruding laterally from the frame 50. Thus the shutters in both cameras may be simultaneously operated by pushing the finger piece 57 to slide the bar laterally so that the forks 56 will move the shutter levers E''.

In view of the foregoing description it is readily evident than an adapter comprising the present invention provides a simple and inexpensive device for adapting twin cameras to take snapshot stereo pictures. By mounting the cameras side-by-side, in this manner, they are properly positioned for taking stereo pictures of all types except extreme closures. Regardless of the type of camera with which the adapter is to be employed, the concept of the invention is identical in that it includes a holder for nesting the front of the rigid camera housings, whether it be the camera casing or the shutter and lens housing, a clamp plate or clamp device for cooperation with the rear of said rigid housing to hold said housings in said frame, and a lever mechanism for cooperation with the shutter levers of the respective cameras to simultaneously move said levers so as to simultaneously operate the respective camera shutters to expose the films in said cameras. Although the adapter is shown in the preferred form, for cooperating with the shutter housings B, it is contemplated as within the scope of the invention to arrange the holder frames for cooperation with the main camera housings which, for convenience of description, have been identified as casings C.

Although certain specific embodiments of the invention have been shown and described, it is obvious that many modifications thereof are possible. The invention, therefore, is not to be restricted except insofar as is necessitated by the prior art and the spirit of the appended claims.

That which is claimed as new is:

1. A holder device for adapting two cameras for taking snapshot stereo pictures and which comprises a plate-like member having two spaced framing openings to receive and position the lens carrying face of the housings of two cameras respectively for taking stereo pictures, the lenses of said cameras being exposed through said openings, a clamp member disposable on the opposite faces of said two cameras and adjustably and detachably secured to the plate-like member for securing said rigid camera housings in said framing-openings, and a manually operable mechanism mounted on said plate-like member for movement and having extensions projecting therefrom to respectively engage with the shutter-levers of both of said cameras when clamped to said plate-like member, a single finger-piece carried by said mechanism for actuating the latter so that operative movement of said mechanism will simultaneously operate the shutters of both of said cameras to take stereo snapshots.

2. A holder device for adapting two cameras for taking snapshot stereo pictures and which comprises a plate-like member having two spaced framing openings therein for receiving and positioning the lens-carrying faces of the housings of two cameras respectively therein and to expose the cameras lenses supported by said housings, a clamp device adapted to engage surfaces to the rear of the lens-carrying surfaces of both cameras, a rod detachably connecting said clamp device and said plate-like member and positioned to lie between said cameras when connected to the plate-like member for binding said cameras in position rigidly to said plate-like member, a shiftable member slidably mounted on said plate member and having arms extending angularly from the ends thereof and rearwardly through slots in said plate member to operatively engage the respective customary shutter-levers of said cameras so that operative movement of said lever will move said arms to simultaneously operate the shutters of both of said cameras, and an adjustable contact member on at least one of said arms to facilitate the snug engagement of both of the shutter-levers by both of said arms.

3. A holder device for adapting two cameras for taking snapshot stereo pictures and which comprises a plate-like member having two spaced framing openings therein each to receive and position the lens-carrying face of the rigid housing of a camera respectively and to expose the camera lenses supported by said housings, a clamp member disposable at the opposite faces of said two cameras, a rod detachably connected with said clamp member and said plate-like member and positioned to lie between said cameras when in position on said plate-like member for securing said cameras in position rigidly in said plate-like member, an articulated lever system mounted on the front face of said plate-like member and having portions thereof that move in the same direction simultaneously, arms extending from said last mentioned portions of said lever system to engage the customary shutter-levers of the camera, and at least one finger-piece carried on said lever system to be manually actuated by the operator of the cameras so that operative movement of said lever system will move said arms to simultaneously operate the shutters of both of said cameras.

LAWRENCE F. CAMPBELL.

REFERENCES CITED

The following references are of record in the file of this patent:

UNITED STATES PATENTS

| Number | Name | Date |
|---|---|---|
| 765,980 | Mercier | July 26, 1904 |
| 1,542,730 | Richards | June 16, 1925 |
| 2,361,661 | Sparling | Oct. 31, 1944 |